US012656931B1

(12) United States Patent
Loggins

(10) Patent No.: US 12,656,931 B1
(45) Date of Patent: Jun. 16, 2026

(54) SYSTEMS AND METHODS FOR TWO-DIMENSIONAL AND THREE-DIMENSIONAL DISPLAY

(71) Applicant: Apple Inc., Cupertino, CA (US)

(72) Inventor: Benjamin B. Loggins, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 18/442,993

(22) Filed: Feb. 15, 2024

Related U.S. Application Data

(60) Provisional application No. 63/485,196, filed on Feb. 15, 2023.

(51) Int. Cl.
*G06F 3/04815* (2022.01)
*H04L 51/046* (2022.01)

(52) U.S. Cl.
CPC ........ *G06F 3/04815* (2013.01); *H04L 51/046* (2013.01)

(58) Field of Classification Search
CPC ........................... G06F 3/04815; H04L 51/046
See application file for complete search history.

(56) References Cited

U.S. PATENT DOCUMENTS

| | | | |
|---|---|---|---|
| 5,015,188 A | 5/1991 | Pellosie et al. |
| 6,167,433 A | 12/2000 | Maples et al. |
| 8,730,156 B2 | 5/2014 | Weising et al. |
| 9,298,334 B1 | 3/2016 | Zimmerman et al. |
| 9,619,105 B1 | 4/2017 | Dal Mutto |
| 9,870,130 B2 | 1/2018 | Schubert et al. |
| 10,564,714 B2 | 2/2020 | Marggraff et al. |
| 10,708,965 B1 | 7/2020 | Subramanian et al. |
| 11,023,035 B1 | 6/2021 | Atlas et al. |
| 11,176,755 B1 | 11/2021 | Tichenor et al. |
| 11,243,734 B2 | 2/2022 | Boissière et al. |
| 11,379,033 B2 | 7/2022 | O'hern et al. |

(Continued)

FOREIGN PATENT DOCUMENTS

| | | |
|---|---|---|
| CN | 110830786 A | 2/2020 |
| CN | 111033572 A | 4/2020 |

(Continued)

OTHER PUBLICATIONS

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

(Continued)

*Primary Examiner* — Jitesh Patel
(74) *Attorney, Agent, or Firm* — Kubota & Basol LLP

(57) ABSTRACT

In some embodiments, an electronic device is in communication with a two-dimensional display device and/or a three-dimensional display device. In some embodiments, the electronic device displays a two-dimensional rendering or a three-dimensional rendering of a user interface element. In some situations, the electronic device uses the two-dimensional display device to display the two-dimensional rendering of the user interface element. In some situations, the electronic device uses the three-dimensional display device to display the three-dimensional rendering of the user interface element.

20 Claims, 10 Drawing Sheets

(56) References Cited

U.S. PATENT DOCUMENTS

| | | |
|---|---|---|
| 11,847,748 B2 | 12/2023 | Liu et al. |
| 2010/0293504 A1 | 11/2010 | Hachiya |
| 2012/0170089 A1 | 7/2012 | Kim et al. |
| 2012/0249741 A1 | 10/2012 | Maciocci et al. |
| 2013/0222227 A1 | 8/2013 | Johansson et al. |
| 2013/0249922 A1 | 9/2013 | Hachiya |
| 2013/0321462 A1 | 12/2013 | Salter et al. |
| 2013/0332890 A1 | 12/2013 | Ramic et al. |
| 2013/0345975 A1 | 12/2013 | Vulcano et al. |
| 2014/0002444 A1 | 1/2014 | Bennett et al. |
| 2014/0078176 A1 | 3/2014 | Kim et al. |
| 2014/0267400 A1 | 9/2014 | Mabbutt et al. |
| 2014/0298273 A1 | 10/2014 | Blackstone et al. |
| 2014/0375683 A1 | 12/2014 | Salter et al. |
| 2015/0067580 A1 | 3/2015 | Um et al. |
| 2015/0121466 A1 | 4/2015 | Brands et al. |
| 2015/0193982 A1 | 7/2015 | Mihelich et al. |
| 2015/0205106 A1 | 7/2015 | Norden |
| 2015/0317831 A1 | 11/2015 | Ebstyne et al. |
| 2015/0331576 A1 | 11/2015 | Piya et al. |
| 2016/0025971 A1 | 1/2016 | Crow et al. |
| 2016/0291922 A1 | 10/2016 | Montgomerie et al. |
| 2016/0370858 A1 | 12/2016 | LeppÄnen et al. |
| 2017/0052373 A1* | 2/2017 | Memmott ............ G06F 3/04845 |
| 2017/0052595 A1 | 2/2017 | Poulos et al. |
| 2017/0053383 A1 | 2/2017 | Heo |
| 2017/0061694 A1 | 3/2017 | Giraldi et al. |
| 2017/0090566 A1 | 3/2017 | George-Svahn et al. |
| 2017/0115728 A1 | 4/2017 | Park et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0213388 A1 | 7/2017 | Margolis et al. |
| 2017/0287215 A1 | 10/2017 | Lalonde et al. |
| 2017/0351094 A1 | 12/2017 | Poulos et al. |
| 2018/0077383 A1 | 3/2018 | Akao et al. |
| 2018/0150204 A1 | 5/2018 | Macgillivray |
| 2018/0173404 A1 | 6/2018 | Smith |
| 2018/0197341 A1 | 7/2018 | Loberg et al. |
| 2018/0275753 A1 | 9/2018 | Publicover et al. |
| 2018/0300952 A1 | 10/2018 | Evans et al. |
| 2018/0350119 A1 | 12/2018 | Kocharlakota et al. |
| 2019/0279407 A1 | 9/2019 | Mchugh et al. |
| 2019/0302977 A1 | 10/2019 | Pendergast et al. |
| 2019/0340832 A1 | 11/2019 | Srinivasan et al. |
| 2019/0369569 A1 | 12/2019 | Olsen et al. |
| 2019/0384406 A1 | 12/2019 | Smith et al. |
| 2020/0048825 A1 | 2/2020 | Schultz et al. |
| 2020/0051527 A1* | 2/2020 | Ngo ................... G06F 3/04842 |
| 2020/0257484 A1 | 8/2020 | Qian et al. |
| 2020/0319704 A1 | 10/2020 | Kathuria et al. |
| 2020/0328913 A1 | 10/2020 | Wyas et al. |
| 2021/0011556 A1 | 1/2021 | Atlas et al. |
| 2021/0034319 A1 | 2/2021 | Wang et al. |
| 2021/0055789 A1 | 2/2021 | Tsai et al. |
| 2021/0067418 A1 | 3/2021 | Ely et al. |
| 2021/0096726 A1 | 4/2021 | Faulkner et al. |
| 2021/0102820 A1 | 4/2021 | Le et al. |
| 2021/0142552 A1 | 5/2021 | Kimura et al. |
| 2021/0158624 A1 | 5/2021 | Moon et al. |
| 2021/0173536 A1 | 6/2021 | Kondo |
| 2021/0191600 A1 | 6/2021 | Lemay et al. |
| 2021/0227601 A1 | 7/2021 | Eom et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0333864 A1 | 10/2021 | Harvey et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0400744 A1 | 12/2021 | Chen et al. |
| 2021/0405760 A1 | 12/2021 | Schoen |
| 2022/0124286 A1 | 4/2022 | Punwani et al. |
| 2022/0179503 A1 | 6/2022 | Timonen et al. |
| 2022/0239718 A1 | 7/2022 | Song et al. |
| 2022/0244536 A1 | 8/2022 | Sha et al. |
| 2022/0253125 A1 | 8/2022 | Wallen et al. |
| 2022/0287676 A1 | 9/2022 | Steines et al. |
| 2022/0291808 A1 | 9/2022 | Stevens et al. |
| 2022/0303680 A1 | 9/2022 | Ahmed et al. |
| 2023/0030699 A1 | 2/2023 | Zion et al. |
| 2023/0031832 A1 | 2/2023 | Lipton et al. |
| 2023/0032771 A1 | 2/2023 | Zion et al. |
| 2023/0094522 A1 | 3/2023 | Stauber et al. |
| 2023/0100689 A1 | 3/2023 | Chiu et al. |
| 2023/0120052 A1 | 4/2023 | Wallen et al. |
| 2023/0176806 A1 | 6/2023 | Chen et al. |
| 2023/0206572 A1 | 6/2023 | Pazmino et al. |
| 2023/0290042 A1 | 9/2023 | Casella et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0360264 A1* | 11/2023 | Wu ........................ G06V 20/20 |
| 2024/0103685 A1 | 3/2024 | Pazmino et al. |
| 2024/0103686 A1 | 3/2024 | Pazmino et al. |
| 2024/0104870 A1 | 3/2024 | Fuste Lleixa et al. |
| 2024/0203066 A1 | 6/2024 | Kawashima et al. |
| 2024/0233288 A1 | 7/2024 | Stauber et al. |
| 2024/0273838 A1 | 8/2024 | Palangie et al. |
| 2024/0281109 A1 | 8/2024 | Manjunath et al. |
| 2024/0361832 A1 | 10/2024 | Calderone et al. |
| 2024/0361833 A1 | 10/2024 | Calderone et al. |
| 2025/0005864 A1 | 1/2025 | Dessero et al. |
| 2025/0199656 A1 | 6/2025 | Lipton et al. |

FOREIGN PATENT DOCUMENTS

| | | |
|---|---|---|
| CN | 111213183 A | 5/2020 |
| CN | 113168737 A | 7/2021 |
| EP | 2458486 A1 | 5/2012 |
| EP | 2893297 A1 | 7/2015 |
| EP | 4155867 A1 | 3/2023 |
| JP | 2019-536131 A | 12/2019 |
| JP | 2022-175629 A | 11/2022 |
| JP | 2023-052278 A | 4/2023 |
| KR | 20110128487 A | 11/2011 |
| KR | 20140097654 A | 8/2014 |
| KR | 20170027240 A | 3/2017 |
| KR | 20180102171 A | 9/2018 |
| KR | 20200110788 A | 9/2020 |
| KR | 20200135496 A | 12/2020 |
| WO | 2018/090060 A1 | 5/2018 |
| WO | 2021/061349 A1 | 4/2021 |
| WO | 2022/055821 A1 | 3/2022 |
| WO | 2022/067343 A2 | 3/2022 |
| WO | 2022/208797 A1 | 10/2022 |

OTHER PUBLICATIONS

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074968, mailed on Feb. 26, 2024, 7 pages.

Notice of Allowance received for U.S. Appl. No. 18/429,294, mailed on Jun. 21, 2024, 10 pages.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Didehkhorshid et al., "Text Input in Virtual Reality Using a Tracked Drawing Tablet", HCII 2020, LNCS 12428, 2020, pp. 314-329.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-

(56)         References Cited

OTHER PUBLICATIONS tablet-for-touch-control-with-vr-headset-on-demo-vid/>, [Retrieved from Internet on Jan. 2, 2024], 9 pages.
Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www. youtube.com/watch?v=rMks7sMzPxl>, 2 pages.
Extended European Search Report received for European Patent Application No. 24158036.4, mailed on Jul. 18, 2024, 12 pages.
International Search Report received for PCT Patent Application No. PCT/US2023/074957, mailed on Jan. 30, 2024, 7 pages.
Non-Final Office Action received for U.S. Appl. No. 18/429,301, mailed on Jun. 12, 2024, 28 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Writtenhouse, Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Notice of Allowance received for U.S. Appl. No. 18/429,294, mailed on Oct. 31, 2024, 10 pages.
Huang, et al., Proxy-Based Security Audit System for Remote Desktop Access, Computer Communications And Networks, ICCCN 2009. Proceedings of 18th International Conference On, IEEE, Piscataway, NJ, USA, Aug. 3, 2009, 5 pages.
Corrected Notice of Allowability received for U.S. Appl. No. 18/146,234, mailed on Feb. 6, 2025, 2 pages.

International Search Report received for PCT Patent Application No. PCT/US2024/030661, mailed on Nov. 4, 2024, 5 pages.
Notice of Allowance received for U.S. Appl. No. 18/146,234, mailed on Jan. 24, 2025, 12 pages.
Notice of Allowance received for U.S. Appl. No. 18/429,301, mailed on Nov. 22, 2024, 8 pages.
Lin, et al., "Ubii: Physical World Interaction Through Augmented Reality", Publisher: IEEE, DOI: 10.1109/TMC.2016.2567378, May 13, 2016, 14 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Search Report received for United Kingdom Patent Application No. GB2210885.6, mailed on Jan. 27, 2023, 1 page.
Zhuang, et al., "Distributed Architecture for 3D Graphics Rendering in Collaborative System", Computer and Modernization, Issue 4, 2017, 5 pages (1 page of English Abstract and 4 pages of Official Copy).

* cited by examiner

DEVICE 100

MEMORY 102

INSTRUCTIONS 104

PROCESSORS 110

I/O INTERFACE 112

TWO-DIMENSIONAL DISLPAY DEVICE 116

THREE-DIMENSIONAL DISLPAY DEVICE 117

OUTPUT DEVICE(S) 118

INPUT DEVICE(S) 120

310

400

SYSTEMS AND METHODS FOR TWO-DIMENSIONAL AND THREE-DIMENSIONAL DISPLAY

CROSS-REFERENCE TO RELATED APPLICATION

This application claims the benefit of U.S. Provisional Application No. 63/485,196, filed Feb. 15, 2023, the content of which is incorporated herein by reference in its entirety for all purposes.

FIELD OF THE DISCLOSURE

Aspects of the present disclosure relate to systems and methods for displaying two-dimensional and three-dimensional renderings of a user interface element.

BACKGROUND OF THE DISCLOSURE

Electronic devices may display user interface elements using one or more display devices.

SUMMARY OF THE DISCLOSURE

Aspects of the present disclosure relate to systems and methods for displaying two-dimensional and three-dimensional renderings of a user interface element. In some embodiments, an electronic device is in communication with a two-dimensional display device and/or a three-dimensional display device. In some embodiments, the electronic device displays a two-dimensional rendering or a three-dimensional rendering of a user interface element. In some situations, the electronic device uses the two-dimensional display device to display the two-dimensional rendering of the user interface element. In some situations, the electronic device uses the three-dimensional display device to display the three-dimensional rendering of the user interface element.

While the foregoing and additional implementations are described herein, still other implementations are possible. Modifications within the spirit and scope of the presently disclosed technology are possible. Accordingly, the drawings and detailed description are to be regarded as illustrative in nature.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
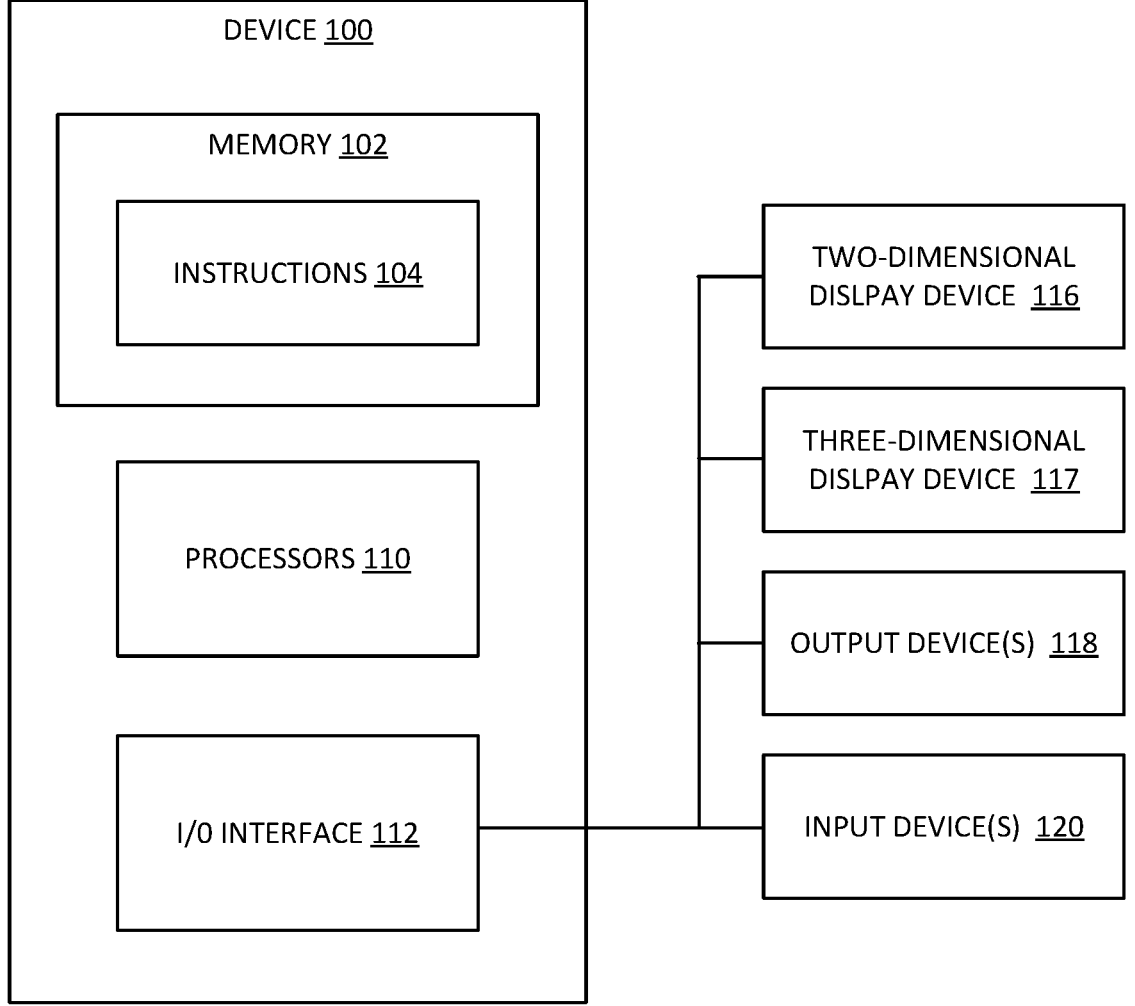
FIG. 1 is an example block diagram of an electronic device according to some embodiments of the disclosure.

Aspects of the present disclosure relate to systems and methods for displaying two-dimensional and three-dimensional renderings of a user interface element. In some embodiments, an electronic device is in communication with a two-dimensional display device and/or a three-dimensional display device. In some embodiments, the electronic device displays a two-dimensional rendering or a three-dimensional rendering of a user interface element. In some situations, the electronic device uses the two-dimensional display device to display the two-dimensional rendering of the user interface element. In some situations, the electronic device uses the three-dimensional display device to display the three-dimensional rendering of the user interface element.

While the foregoing and additional implementations are described herein, still other implementations are possible. Modifications within the spirit and scope of the presently disclosed technology are possible. Accordingly, the drawings and detailed description are to be regarded as illustrative in nature.

While the foregoing and additional implementations are described herein, still other implementations are possible. Modifications within the spirit and scope of the presently disclosed technology are possible. Accordingly, the drawings and detailed description are to be regarded as illustrative in nature, and not limiting.

While some embodiments of the disclosure are described above and herein, additional and alternative embodiments are possible. Example embodiments are provided in the drawings and detailed description and are illustrative in nature. Modifications to the example embodiments are possible without departing from the scope of the disclosure.

FIG. 1 is an example block diagram of an electronic device 100 according to some embodiments of the disclosure. In some embodiments, the electronic device 100 includes memory 102, one or more processors 110 and an I/O interface 112. In some embodiments, the electronic device 100 includes additional or alternative components.

In some embodiments, memory 102 of electronic device 100 includes volatile and/or non-volatile memory implemented using electronic, electromagnetic, magnetic, infrared, optical, and/or semiconductor system(s) and/or device (s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible in some embodiments. In some examples, memory 102 can be separate from the one or more other components of electronic device 100 and electrically coupled to the one or more other components of electronic device 100 for read and/or write operations. In some examples, some of memory 102 can be integrated within other components of electronic device 100.

In some examples, at least a portion of the memory 102 can be referred as a computer-readable storage medium. Memory 102 and/or a transitory or non-transitory computer readable storage medium of memory 102 can store instructions 104, programs, data structures and/or modules or a subset or combination thereof in some embodiments. In some embodiments, memory 102 and/or the computer readable storage medium can store instructions 104, which when executed by processors 110, can cause the electronic device 100 (or a computing system more generally) to perform one or more functions and methods of one or more examples of this disclosure, such as one or more of the methods described in more detail below with reference to FIGS. 2-4. As used herein, a "non-transitory computer-readable storage medium" includes any tangible medium (e.g., excluding signals) that can contain or store programs/instructions for use by the electronic device (e.g., processing circuitry), for example.

In some embodiments, the electronic device 100 further includes one or more processors 110. Processors 110 can include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 100 can use processors 110 to perform any of the functions, processes, and/or methods described herein (e.g., optionally by executing instructions or programs stored in memory 102 and/or a non-transitory computer-readable storage medium).

In some embodiments, the electronic device 100 further includes an I/O interface 112. I/O interface 112 includes circuitry such as data lines, address lines, and control lines, for example, that enable communication between the electronic device 100 and one or more peripherals, such as two-dimensional display device 116, three-dimensional display device 117, other output device(s) 118, and input device(s) 120. Example two-dimensional display devices 116 include, but are not limited to, monitors, television screens, touch screens, projectors, and/or touch screens implemented with LCD (liquid crystal display), LED (light emitting diode), OLED (organic light emitting diode), and/or other technology. Examples of three-dimensional display devices 117 include head-mounted displays, contact lens-integrated displays, and/or hologram displays. Examples of other output device(s) 118 include, but are not limited to, audio output devices (e.g., wired and/or wireless speakers and/or headphones), tactile output devices (e.g., haptic and/or vibration devices), and other visual output devices (e.g., indicator lights). Example input device(s) 120 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers. In some embodiments, the electronic device 100 is in communication with one or more of the input device(s) and/or output device(s) shown in FIG. 1 as coupled to the I/O interface 112 using wireless communication and/or connection(s). In some embodiments, the electronic device 100 is in communication with one or more of the input device(s) and/or output device(s) shown in FIG. 1 as coupled to the I/O interface 112 using wired communication and/or connection (s).

Example electronic devices 100 include laptop or desktop computers, tablets, smartphones, media players, and wearable devices (e.g., smart watches or head mounted displays). For example, electronic device 100 is a laptop computer having a two-dimensional display device 116 (e.g., a laptop display) integrated therein, and the laptop computer is in communication with a three-dimensional display device 117 (e.g., a head-mounted display). In this example, the processors 110 of the laptop computer execute one or more programs stored in the memory 102 of the laptop computer that include displaying two-dimensional and/or three-dimensional renderings of user interface elements. As another example, the electronic device 100 is a head-mounted device having a three-dimensional display device 117 (e.g., a head-mounted display) integrated therein, and the head-mounted device is in communication with a two-dimensional display device 116 (e.g., a monitor or the display of a laptop computer). In this example, the processors 110 of the head-mounted device execute one or more programs stored in the memory 102 of the head-mounted device that include displaying two-dimensional and/or three-dimensional renderings of user interface elements. In another example, the electronic device 100 is a desktop computer that is in communication with a two-dimensional display device 116 (e.g., a monitor) and a three-dimensional display device 117 (e.g., a head-mounted display). In this example, the processors 110 of the desktop computer execute one or more programs stored in the memory 102 of the desktop computer that include displaying two-dimensional and three-dimensional renderings of user interface elements.

As described above, the components and configuration of components of electronic device 100 according to the disclosure are not limited by the example illustrated and described with reference to FIG. 1. In some embodiments, one or more of the components of the electronic device 100 included in FIG. 1 and any additional components of the electronic device 100 not shown in FIG. 1 are in communication with each other and/or integrated with each other. In some embodiments, additional or alternative components and/or configurations are possible.

Figure 2A:
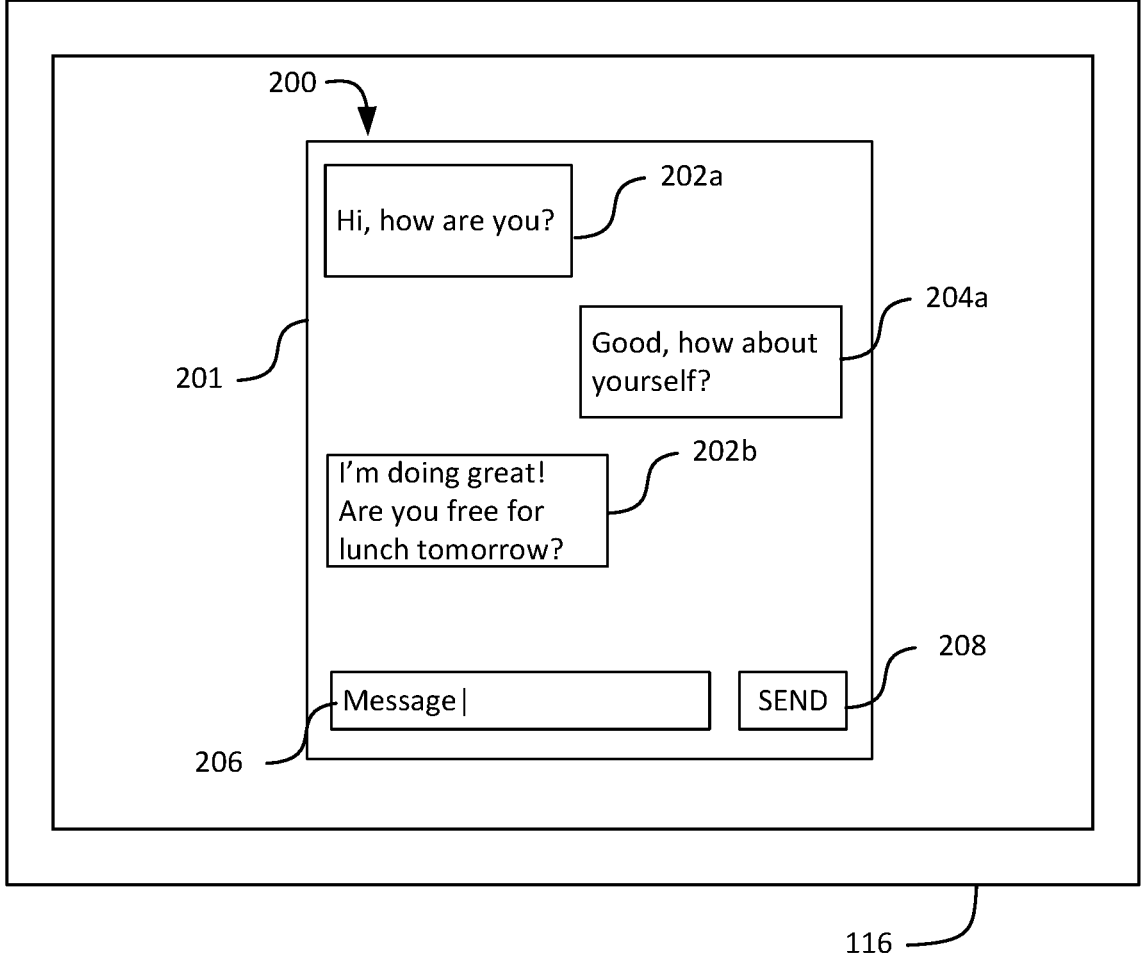
FIGS. 2A-2E illustrate examples of two-dimensional and three-dimensional renderings of a user interface element according to some embodiments of the disclosure.

FIGS. 2A-2E illustrate examples of two-dimensional and three-dimensional renderings of a user interface element according to some embodiments of the disclosure. FIG. 2A illustrates an example of a two-dimensional rendering 200 of a user interface element. In some embodiments, an electronic device 100 described above with reference to FIG. 1 displays the two-dimensional rendering 200 using a two-dimensional display device 116 described above with reference to FIG. 1. In the example shown in FIG. 2A, the two-dimensional rendering 200 is a user interface of a messaging application. The two-dimensional rendering 200 can include a container 201 of the user interface (e.g., a window or backplane), representations 202a and 202b of messages received from another electronic device, a representation 204a of a message sent by the electronic device 100, a text entry field 206 into which the user can enter text for a new message, and a selectable option 208 that, when selected, causes the electronic device 100 to send the message composed in the text entry field 206 to the messaging conversation.

As shown in FIG. 2A, the two-dimensional rendering 200 of the messaging user interface includes two-dimensional user interface elements. For example, the container 201, message representations 202a, 202b, and 204a, text entry field 206, and selectable option 208 are presented in two dimensions.

In some embodiments, the electronic device 100 displays the two-dimensional rendering 200 of the messaging user interface using the two-dimensional display device 116 in accordance with one or more criteria for displaying a three-dimensional rendering (see FIG. 2B) not being satisfied. In some embodiments, the one or more criteria are not satisfied when the electronic device 100 is not in communication with a three-dimensional display device 117.

In some embodiments, the one or more criteria are not satisfied when the electronic device 100 receives a user input requesting to display the two-dimensional rendering 200 of the messaging user interface. For example, the input includes a request to display the two-dimensional rendering

200 of the messaging user interface without displaying a three-dimensional rendering of the messaging user interface. In some embodiments, as described below with reference to FIG. 2D, the electronic device 100 displays the two-dimensional rendering 200 concurrently with a three-dimensional rendering of the messaging user interface. In some embodiments, in response to receiving the input corresponding to the request to display the two-dimensional rendering 200 of the messaging user interface, the electronic device 100 displays the two-dimensional rendering 200 even if one or more of the other criteria for displaying the three-dimensional rendering are satisfied.

In some embodiments, the one or more criteria for displaying a three-dimensional rendering are not satisfied when a system setting is in place that causes the electronic device 100 to display two-dimensional renderings instead of the three-dimensional renderings. For example, even if the electronic device 100 is in communication with the three-dimensional display device 117, if the setting for displaying the two-dimensional renderings instead of three-dimensional renderings is activated, the electronic device 100 displays the two-dimensional rendering 200 instead of displaying a three-dimensional rendering of the messaging user interface. In some situations, the electronic device 100 displays the two-dimensional rendering 200 using a three-dimensional display device 117 instead of or in addition to a two-dimensional display device 116, as described in more detail below with reference to FIGS. 2C and 2E, for example.

Figure 2B:
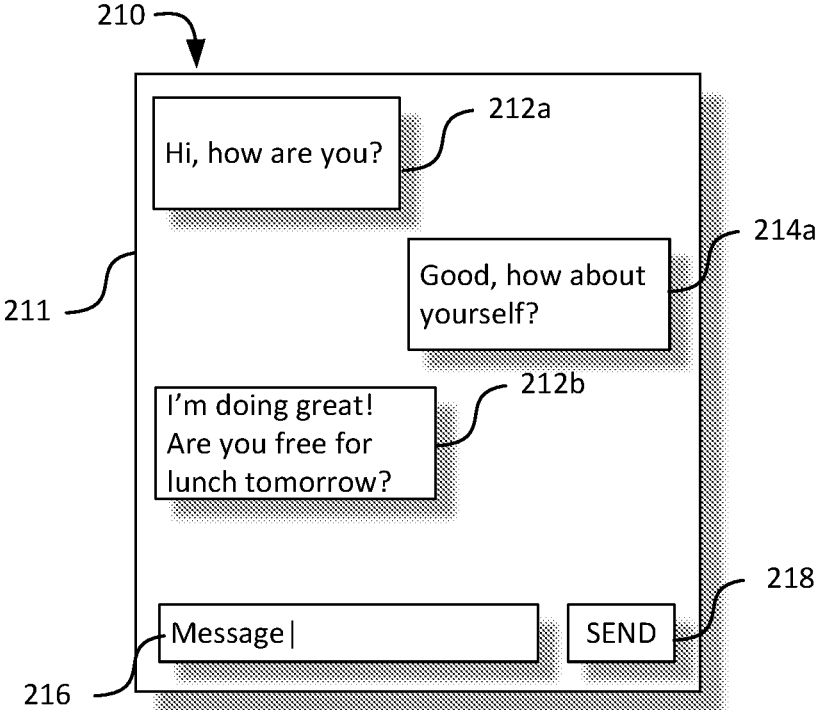

FIG. 2B illustrates an example of a three-dimensional rendering 210 of a user interface element in accordance with some embodiments of the disclosure. In some embodiments, an electronic device 100 described above with reference to FIG. 1 displays the three-dimensional rendering 210 using a three-dimensional display device 117 described above with reference to FIG. 1. In the example shown in FIG. 2B, the three-dimensional rendering 210 is a user interface of a messaging application that corresponds to the two-dimensional rendering 200 described above with reference to FIG. 2A. For example, two-dimensional rendering 200 and three-dimensional rendering 210 are renderings of the same messaging application user interface including the same messaging conversation. The three-dimensional rendering 210 can include similar elements to the elements of the two-dimensional rendering 200, except the elements of the three-dimensional rendering 210 are three-dimensional instead of being two-dimensional. For example, the three-dimensional rendering 210 includes a container 211 of the user interface (e.g., a window or backplane), representations 212a and 212b of messages received from another electronic device, a representation 214a of a message sent by the electronic device 100, a text entry field 216 into which the user can enter text for a new message, and a selectable option 218 that, when selected, causes the electronic device 100 to send the message composed in the text entry field 216 to the messaging conversation.

In some embodiments, the three-dimensional display device 117 displays the three-dimensional rendering 210 in a three-dimensional environment. For example, the three-dimensional environment can be an XR (extended reality) environment that further includes representations of real objects in the environment of the three-dimensional display device 117 and/or electronic device 100. In some embodiments, the representations of real objects can be displayed using "optical" passthrough in which the user is able to view portions of the real environment through transparent portions of the three-dimensional display device 117. In some embodiments, the representations of real objects can be displayed using "virtual," "video," or "digital" passthrough in which the electronic device 100 captures one or more images of the environment of the three-dimensional display device 117 and/or the electronic device 100 using one or more cameras and displays three-dimensional images of the real objects using the three-dimensional display device 117. For example, the electronic device 100 captures the images of the real environment using one or more cameras integrated with the three-dimensional display device 117. In some embodiments, additionally or alternatively, the XR environment includes three-dimensional renderings of additional virtual objects, such as other user interface elements and/or virtual representations of real objects not present in the real environment.

In some embodiments, the three-dimensional environment can be a VR (virtual reality) environment that does not include representations of real objects in the real environment of the electronic device 100 and/or three-dimensional display device 117. For example, the electronic device 100 generates an immersive virtual environment and displays the three-dimensional rendering 210 of the messaging application in the immersive virtual environment using the three-dimensional display device 117. In some embodiments, additionally or alternatively, the VR environment includes three-dimensional renderings of additional virtual objects, such as other user interface elements and/or virtual representations of real objects not present in the real environment.

As shown in FIG. 2B, the three-dimensional rendering 210 of the messaging user interface includes three-dimensional user interface elements. For example, the container 211, message representations 212a, 212b, and 214a, text entry field 216, and selectable option 218 are displayed in three dimensions, as illustrated by the simulated shadows shown in FIG. 2B. It should be noted that, in some embodiments, container 211 is a two-dimensional container displayed in a three-dimensional environment. In some embodiments, the container 211 is a three-dimensional container with a non-zero thickness. In some embodiments, the message representations 212a, 212b, and 214a, text entry field 216, and selectable option 218 are displayed with visual separation from container 211. For example, the electronic device 101 displays simulated shadows of representations 212a, 212b, and 214a, text entry field 216, and selectable option 218 against container 211. As another example, the electronic device 101 displays representations 212a, 212b, and 214a, text entry field 216, and selectable option 218 at a between the viewpoint of the user of the electronic device 100 and the container 211 in the three-dimensional environment.

In some embodiments, the electronic device 100 displays the three-dimensional rendering 210 of the messaging user interface using the three-dimensional display device 117 in accordance with the one or more criteria for displaying a three-dimensional rendering being satisfied. As described above with reference to FIG. 2A, in some embodiments, the one or more criteria include criteria that are satisfied when the electronic device 100 is in communication with a three-dimensional display device 117, when the electronic device 100 receives a user input requesting to display the three-dimensional rendering 210 of the messaging user interface, and/or when a system setting is in place that causes the electronic device 100 to display three-dimensional renderings instead of the two-dimensional renderings. In some situations, the electronic device 100 displays the two-dimensional rendering 200 using a three-dimensional display device 117 instead of or in addition to a two-dimensional display device 116, as described in more detail below with reference to FIGS. 2C and 2E, for example.

Figure 2C:
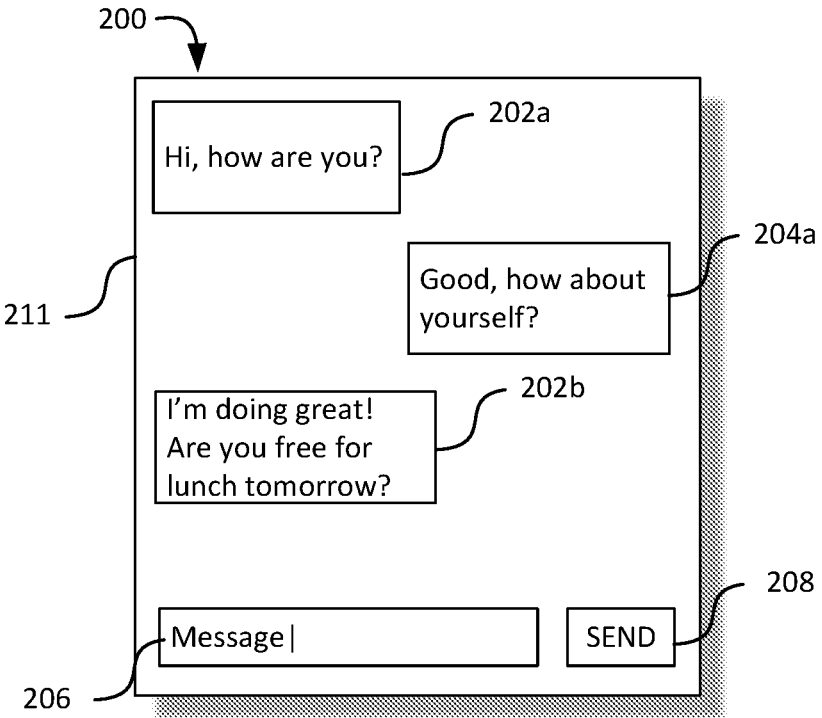

FIG. 2C illustrates an example of a two-dimensional rendering 200 of a user interface element in accordance with some embodiments of the disclosure. In some embodiments, the electronic device 100 displays the two-dimensional rendering 200 in FIG. 2C using the three-dimensional display device 117. For example, the electronic device 100 uses the three-dimensional display device 117 to display the two-dimensional rendering 200 in a three-dimensional environment. As shown in FIG. 2C, in some embodiments, the electronic device 100 displays the two-dimensional rendering 200 of the user interface in a three-dimensional container 211. In some embodiments, the electronic device 100 displays the two-dimensional rendering 200 of the user interface in a two-dimensional container the same as or similar to two-dimensional container 201 in FIG. 2A. In some embodiments, the electronic device 100 uses the three-dimensional display device 117 to display the two-dimensional rendering 200 of the user interface element in a three-dimensional environment. In some embodiments, the electronic device 100 displays the two-dimensional rendering 200 instead of a three-dimensional rendering in response to a user input and/or because a setting is activated on the electronic device 100 that causes the electronic device 100 to forgo displaying three-dimensional renderings.

Figure 2D:
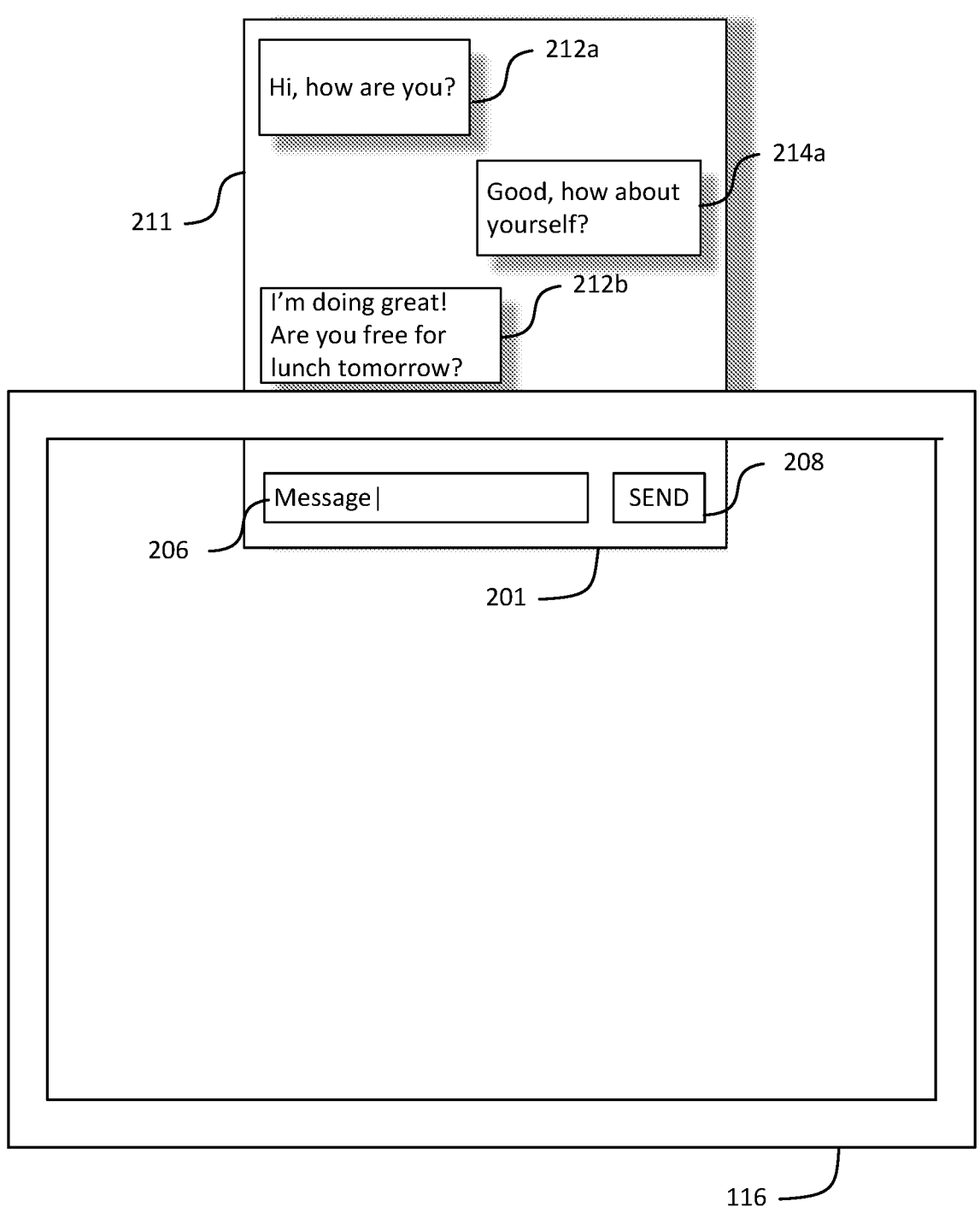

FIG. 2D illustrates an example of augmenting a two-dimensional display device 116 using a three-dimensional display device 117 in accordance with some embodiments of the disclosure. In some embodiments, the electronic device 100 simulates expanding the display area of a two-dimensional display device 116 such as a computer monitor or laptop display using a three-dimensional display device 117 such as a head-mounted display. In some embodiments, the electronic device 100 displays a three-dimensional extended reality (XR) environment using the three-dimensional display device 117 that includes portions of the physical environment of the three-dimensional display device 117 and/or the electronic device 100 as described above. In some embodiments, the two-dimensional display device 116 is included in portions of the physical environment included in the three-dimensional XR environment, and the user is able to view user interface elements displayed using the two-dimensional display device 116 within the three-dimensional XR environment. In some embodiments, the electronic device 100 extends the display area of the two-dimensional display device 116 using the three-dimensional display device 117. For example, the electronic device 100 displays portions of user interface elements that are beyond the displayable region of the two-dimensional display device 116 using the three-dimensional display device as shown in FIG. 2D.

As shown in FIG. 2D, the electronic device 100 uses the two-dimensional display device 116 to display a first portion of the user interface element in a two-dimensional container 201 and uses the three-dimensional display device 117 to display a second portion of the display device in a three-dimensional container 211, for example. In this example, the electronic device 100 displays the text entry field 206 and send option 208 in two dimensions using the two-dimensional display device and displays representations 212a, 212b, and 214a of messages in three dimensions using the three-dimensional display device 117. In some embodiments, without augmenting the two-dimensional display device 116 with the three-dimensional display device 117, a portion of the user interface element would be cut off by the boundary of the two-dimensional display device 116 if the user interface element were to be displayed at the same size and location in the two-dimensional display device 116. In some embodiments, rather than displaying user interface elements with portions displayed by the two-dimensional display device 116 and portions displayed using the three-dimensional display device 117, the electronic device 100 displays entire user interface elements either using the two-dimensional display device 116 or the three-dimensional display device 117. In some embodiments, the electronic device permits? the user is able to drag user interface elements between the display area of the two-dimensional display 116 and portions of the three-dimensional XR environment outside of the display area of the two-dimensional display 117.

Figure 2E:
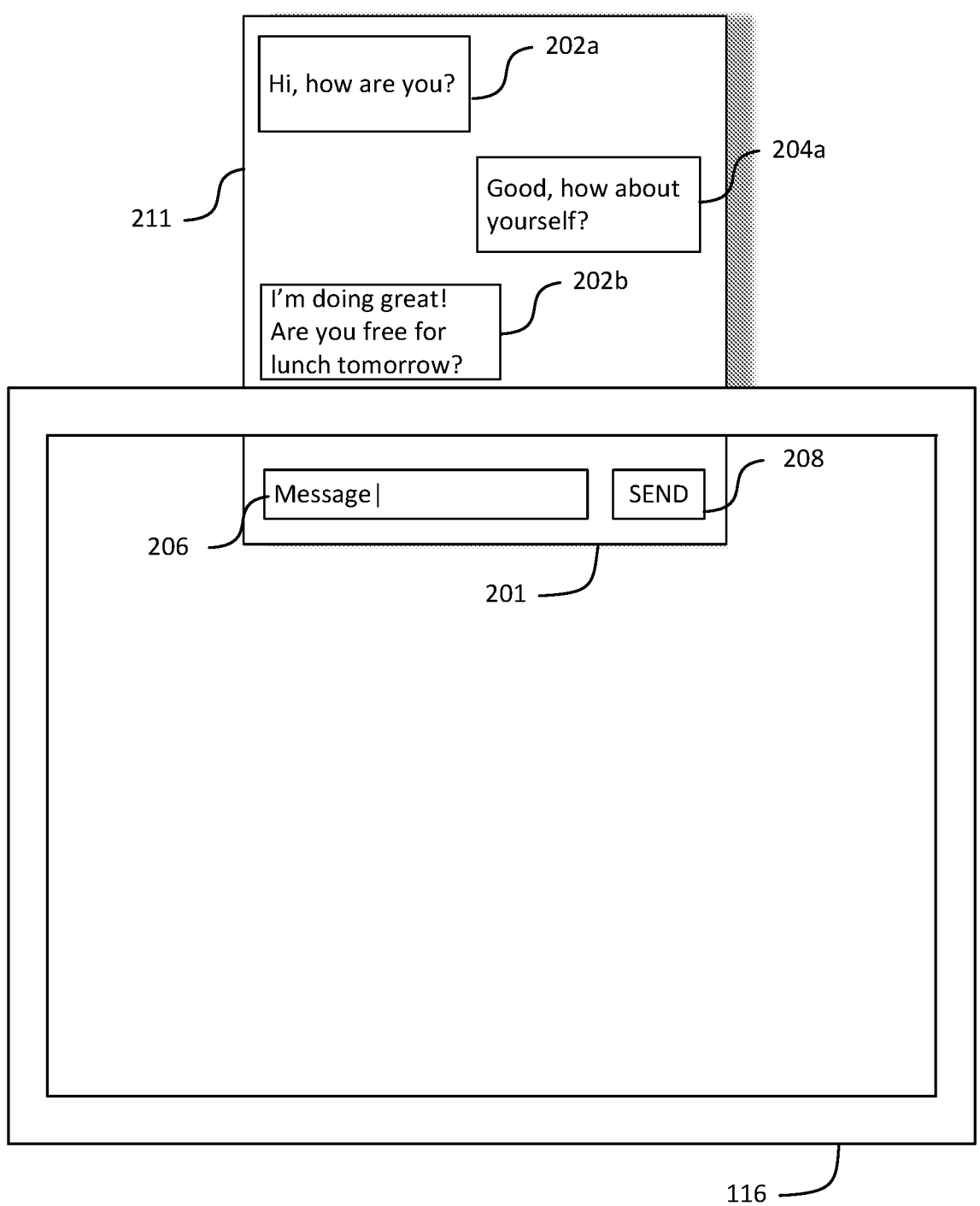

FIG. 2E illustrates an example of augmenting a two-dimensional display device 116 using a three-dimensional display device in accordance with some embodiments of the disclosure. In some embodiments, the example in FIG. 2E is similar to the example in FIG. 2D, except the portion of the user interface element that the electronic device 100 displays using the three-dimensional display device 117 is displayed in two dimensions. For example, the electronic device 100 displays the representations 202a, 202b, and 204a of messages in two dimensions using the three-dimensional display device 117. In some embodiments, as shown in FIG. 2E, the three-dimensional display device 117 displays the representations 202a, 202b, and 204a of the messages in a three-dimensional container 211. In some embodiments, the three-dimensional display device 117 displays the representations 202a, 202b, and 204a of the messages in a two-dimensional container.

Figure 3A:
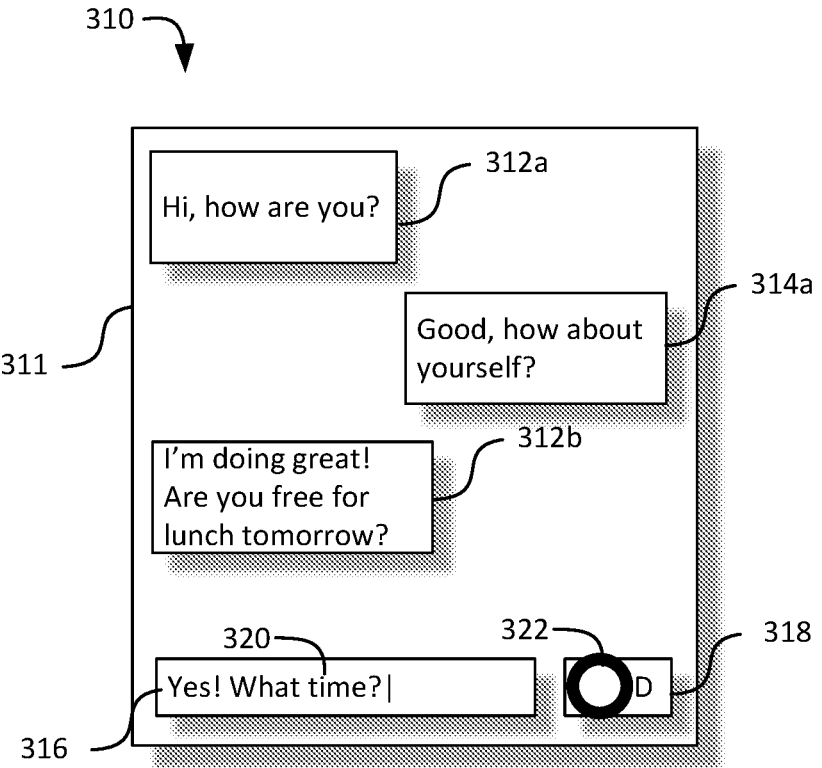
FIGS. 3A-3C illustrate examples of preserving changes to a user interface when transitioning between displaying a two-dimensional representation of the user interface and displaying a three-dimensional rendering of the user interface in accordance with some embodiments of the disclosure.
Figure 3B:
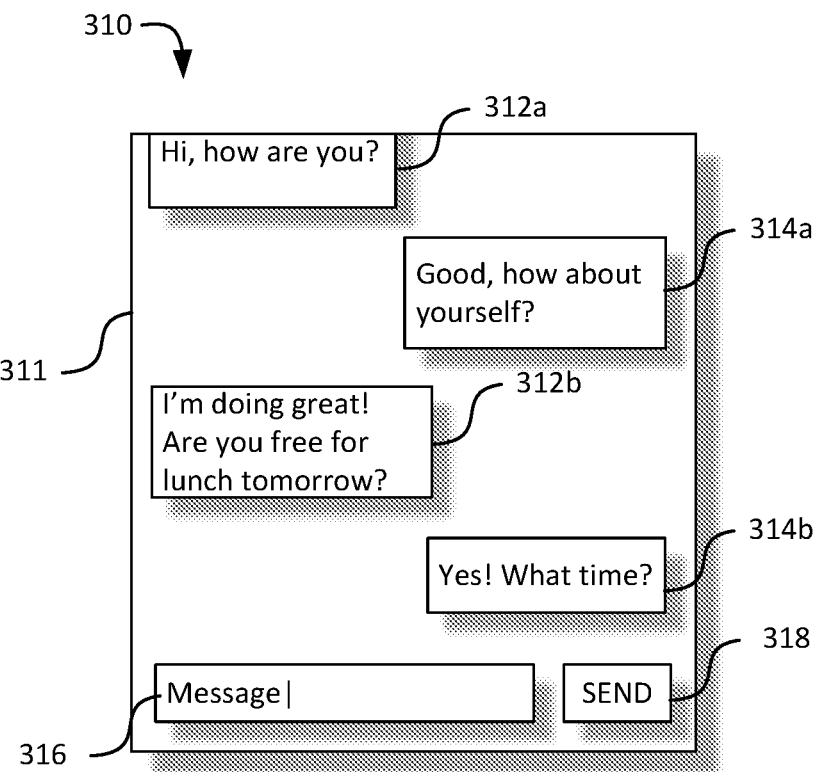
Figure 3C:
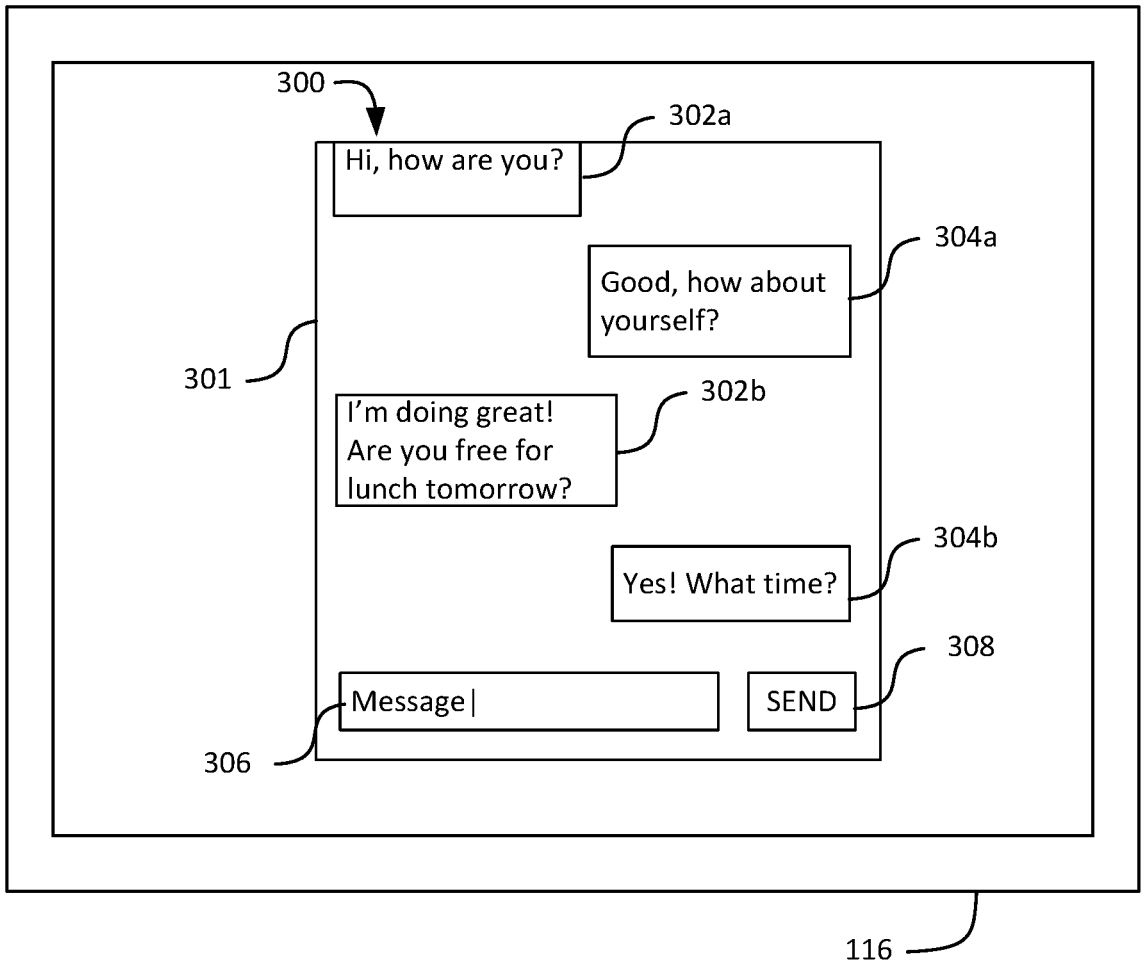

FIGS. 3A-3C illustrate examples of preserving changes to a user interface when transitioning between displaying a two-dimensional representation of the user interface and displaying a three-dimensional rendering of the user interface in accordance with some embodiments of the disclosure. Referring to FIG. 3A, the electronic device 100 uses the three-dimensional display device 117 to display a three-dimensional rendering 310 of a messaging user interface that is the same as or similar to the messaging user interface described above with reference to FIGS. 2A-2E in some embodiments. For example, the three-dimensional rendering 310 includes a container 311 similar to container 211, representations 312a, 312b, and 314a of messages similar to representations 212a, 212b, and 214a, a text entry field 316 similar to text entry field 216, and a send option 318 similar to send option 218.

As shown in FIG. 3A, for example, the text entry field 316 includes text 320 the user previously provided to the electronic device 100. In some embodiments, the text 320 is a draft of a message to be sent to the messaging conversation. In some embodiments, the electronic device 100 enters text 320 into the text entry field 316 in response to a sequence of inputs received using an input device (e.g., a hardware keyboard, a soft keyboard, or a voice input interface). In some embodiments, the electronic device 100 receives an input 322 selecting the send option 318 while the text entry field 316 includes the text 320. In some embodiments, the input 322 is received using a mouse trackpad, touch screen, or another input device in communication with the electronic device 100. In some embodiments, the input 322 is a gesture detected by a touch screen, trackpad and/or one or more cameras. In response to the input in FIG. 3A, the electronic device 100 sends a message to the messaging conversation including text 320 as shown in FIG. 3B.

FIG. 3B illustrates an example of an updated version of the three-dimensional rendering 310 of the user interface in accordance with some embodiments of the disclosure. As shown in FIG. 3B, the updated version of the three-dimensional rendering 310 of the user interface includes a representation 314*b* of the message the electronic device 100 sent to the messaging conversation in response to the input in FIG. 3A. For example, the electronic device updates the three-dimensional rendering 310 of the messaging conversation in FIG. 3B because the electronic device updates the messaging conversation in response to receiving the input to send the message corresponding to representation 314*b*. As shown in FIG. 3B, the representation 314*b* of the message includes the text that was displayed in the text entry field 316 in FIG. 3A. In some embodiments, if the electronic device 100 displays a two-dimensional rendering of the messaging user interface after the user sent the message corresponding to representation 314*b*, the two-dimensional rendering of the messaging user interface will include a two-dimensional representation 304*b* of the message, as shown in FIG. 3C.

FIG. 3C illustrates an example of an updated version of the two-dimensional rendering 300 in accordance with some embodiments of the disclosure. The updated version of the two-dimensional rendering 300 optionally corresponds to the updated messaging conversation; that is, the messaging conversation updated in response to receiving the input corresponding to a request to send a message to the conversation. In some embodiments, two-dimensional rendering 300 corresponds to the three-dimensional rendering 310 described above with reference to FIGS. 3A-3B. For example, the three-dimensional rendering 310 of the messaging user interface includes representations 302*a*, 302*b*, 304*a*, and 304*b* of messages in the messaging conversation, text entry field 306, send option 308, and container 301. In some embodiments, in response to the user sending a message to the messaging conversation using the two-dimensional rendering 300 of the messaging user interface, the electronic device 100 will likewise display a representation of the new message when displaying the three-dimensional rendering 310 of the messaging user interface after the message was sent. Moreover, in some embodiments, if the messaging conversation is updated in other ways, such as the device 100 receiving a new message or one or more messages being deleted from the messaging conversation, those updates will be made to the two-dimensional rendering 300 and the three-dimensional rendering 310 of the messaging conversation irrespective of which rendering was displayed when the change was detected by the electronic device 100. Thus, in some embodiments, when the electronic device updates a virtual object (e.g., the messaging conversation) while displaying the two-dimensional rendering or the three-dimensional rendering of that virtual object, the electronic device updates both the two-dimensional rendering and the three-dimensional rendering of the virtual object.

Although various examples have been described with respect to the messaging user interface shown in FIGS. 2A-3C, it should be understood that the disclosure is not limited to messaging user interfaces. In some embodiments, one or more of the techniques described above can be applied to other user interface elements, including user interfaces of other applications, portions of user interfaces, and other virtual objects.

Figure 4:
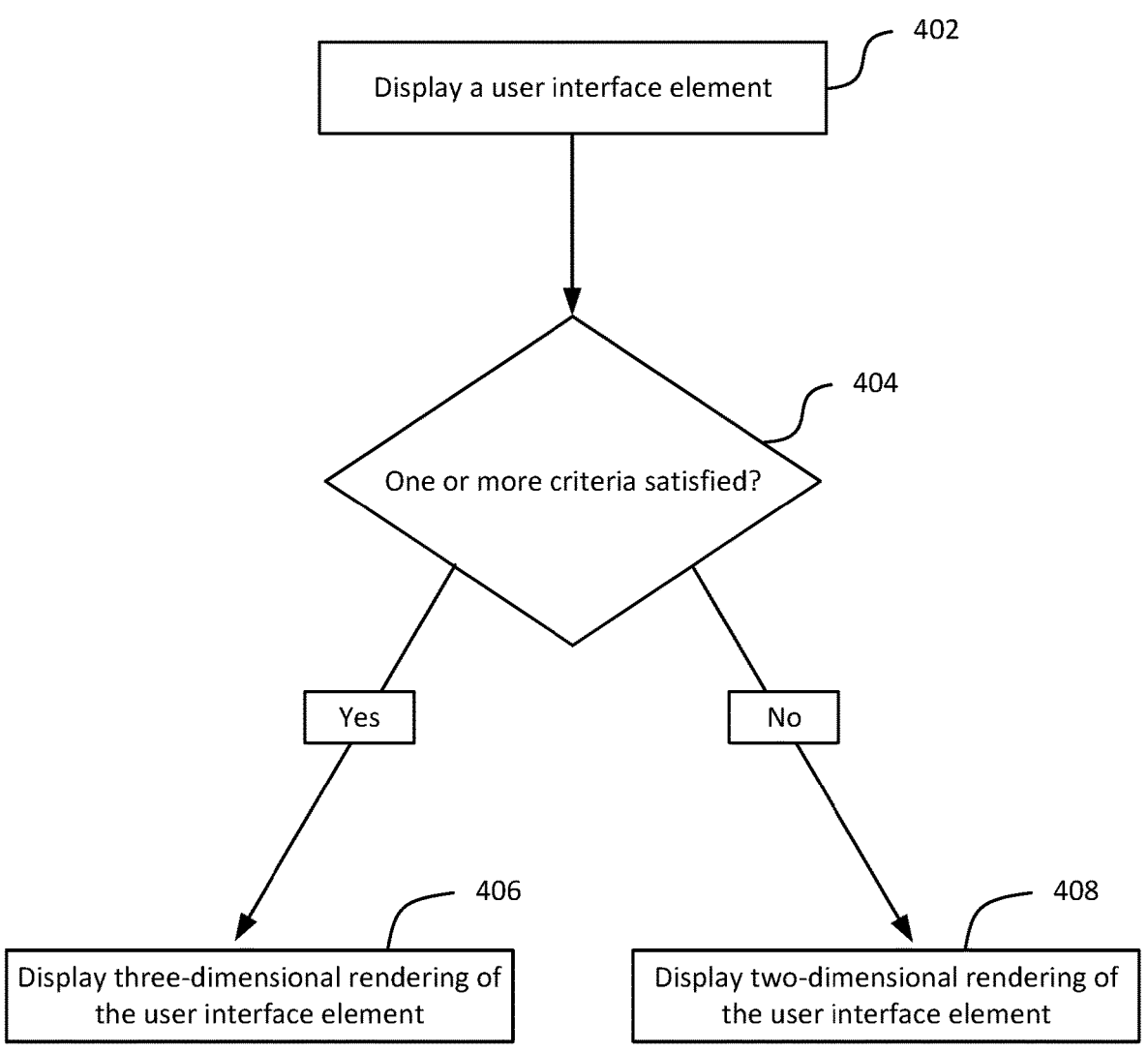
FIG. 4 is a block diagram illustrating an example method performed by an electronic device in accordance with some embodiments of the disclosure.

FIG. 4 is a block diagram illustrating an example method 400 performed by an electronic device 100 in accordance with some embodiments of the disclosure. For example, electronic device 100 described above with reference to FIG. 1 performs method 400 to determine whether to display a user interface element as a three-dimensional rendering or as a two-dimensional rendering. In some embodiments, performing the method 400 includes performing one or more operations described above with reference to FIGS. 2A-3C.

At block 402, the electronic device 100 displays a user interface element in some embodiments. For example, the user interface element is the messaging user interface described above with reference to FIGS. 2A-3C. As described above with reference to FIGS. 2A-3C and in more detail below, displaying the user interface element includes displaying a two-dimensional rendering of the user interface element and/or a three-dimensional rendering of the user interface element depending on whether one or more criteria are satisfied.

At block 404, in some embodiments, the electronic device 100 determines whether one or more criteria are satisfied. For example, the one or more criteria are one or more criteria for displaying a three-dimensional rendering of the user interface element instead of a two-dimensional rendering of the user interface element. In some embodiments, the one or more criteria include one or more of the following: receiving a user input that corresponds to a request to display the user interface element as a three-dimensional rendering, a three-dimensional display device 117 being in communication with the electronic device 100, and/or a setting or mode for displaying three-dimensional renderings being activated on the electronic device 100.

At block 406, in some embodiments, in response to the one or more criteria being satisfied (e.g., "yes" at block 404), the electronic device 100 displays the three-dimensional rendering of the user interface element. For example, while the electronic device 100 is in communication with the three-dimensional display device 117, in response to receiving an input to display a user interface element in three dimensions, the electronic device 100 displays the three-dimensional rendering of the user interface element. As another example, while the electronic device 100 is in communication with the three-dimensional display device 117 and in a mode where the electronic device 100 defaults to displaying user interface elements in three dimensions, the electronic device 100 displays the three-dimensional rendering of the user interface element.

At block 408, in some embodiments, in response to the one or more criteria not being satisfied (e.g., "no" at block 408), the electronic device 100 displays the two-dimensional rendering of the user interface element. For example, if the electronic device 100 is not in communication with the three-dimensional display device 117, the electronic device 100 uses the two-dimensional display device 116 to display the two-dimensional rendering of the user interface element. As another example, irrespective of whether electronic device 100 is in communication with the electronic device 100, if a mode for displaying user interface elements in three dimensions is not activated and the electronic device 100 does not receive an input corresponding to a request to display the user interface element in three dimensions, the electronic device 100 displays the two-dimensional rendering of the user interface element. In this example, the electronic device 100 can use the two-dimensional display device 116 to display the two-dimensional rendering or, if the electronic device 100 is in communication with the three-dimensional display device 117, the electronic device 100 can use the three-dimensional display device 117 and/or the two-dimensional display device 116 to display the two-dimensional rendering.

Therefore, according to the above, some embodiments are directed to An electronic device comprising: memory; and one or more processors coupled to the memory and to one or more output devices, the one or more processors configured to: while the electronic device is in communication with a two-dimensional display device and a three-dimensional display device included in the one or more output devices, display, using the one or more output devices, a user interface element associated with an application running on the electronic device, including: in accordance with a determination that one or more criteria are satisfied, transmitting instructions to the three-dimensional display device to display a three-dimensional rendering of the user interface element; and in accordance with a determination that the one or more criteria are not satisfied, transmitting instructions to the two-dimensional display device to display a two-dimensional rendering of the user interface element. Additionally or alternatively, in some embodiments the one or more processors are configured to: while displaying the three-dimensional rendering of the user interface element using the three-dimensional display device, receive, from the three-dimensional display device, an indication of an update to the three-dimensional rendering of the user interface element; and in response to receiving the indication of the update to the three-dimensional rendering of the user interface element, update the two-dimensional rendering of the user interface element in a manner corresponding to the update to the three-dimensional rendering of the user interface element. Additionally or alternatively, in some embodiments the one or more processors are further configured to in accordance with a determination that one or more second criteria are satisfied, transmit instructions to the three-dimensional display device to display the two-dimensional rendering of the user interface element in a three-dimensional environment. Additionally or alternatively, in some embodiments the one or more processors are further configured to: while displaying the three-dimensional rendering of the user interface element using the three-dimensional display device, receive, using one or more input devices in communication with the electronic device, a user input corresponding to a request to display the two-dimensional rendering of the user interface element; and in response to receiving the user input, transmit second instructions to display the two-dimensional rendering of the user interface element. Additionally or alternatively, in some embodiments transmitting the second instructions to display the two-dimensional rendering of the user interface element includes transmitting the second instructions to display the two-dimensional rendering of the user interface element to the two-dimensional display device. Additionally or alternatively, in some embodiments transmitting the second instructions to display the two-dimensional rendering of the user interface element includes transmitting the second instructions to display the two-dimensional rendering of the user interface element to the three-dimensional display device. Additionally or alternatively, in some embodiments the second instructions to display the two-dimensional rendering of the user interface element are instructions to display the two-dimensional rendering of the user interface element with the three-dimensional display device as an augmentation of the two-dimensional display device. Additionally or alternatively, in some embodiments the one or more processors are further configured to while displaying the two-dimensional rendering of the user interface element, receive, using one or more input devices in communication with the electronic device, a user input corresponding to a request to display the three-dimensional rendering of the user interface element and in response to receiving the user input, transmit second instructions to the three-dimensional display device to display the three-dimensional rendering of the user interface element. Additionally or alternatively, in some embodiments the one or more criteria include a criterion that is satisfied when the electronic device is in communication with the three-dimensional display device. Additionally or alternatively, in some embodiments the one or more processors are configured to: while the one or more criteria are not satisfied, and while displaying the two-dimensional rendering of the user interface element, detect the one or more criteria transition from being not satisfied to being satisfied, and in response to detecting the one or more criteria transition from being not satisfied to being satisfied, transmit instructions to the three-dimensional display device to: display an animated transition from displaying the two-dimensional rendering of the user interface element to displaying the three-dimensional rendering of the user interface element, and after displaying the animated transition, display the three-dimensional rendering of the user interface element. Additionally or alternatively, in some embodiments, the one or more processors are further configured to receive an indication to update data represented by the user interface element; in response to receiving the indication to update the data represented by the user interface element, update the data represented by the user interface element; update the two-dimensional rendering of the user interface element in accordance with the indication; and update the three-dimensional rendering of the user interface element in accordance with the indication Some embodiments are directed to a method comprising: at an electronic device including memory and one or more processors coupled to the memory and to one or more output devices: while the electronic device is in communication with a two-dimensional display device and a three-dimensional display device included in the one or more output devices, displaying, using the one or more output devices, a user interface element associated with an application running on the electronic device, including in accordance with a determination that one or more criteria are satisfied, transmitting instructions to the three-dimensional display device to display a three-dimensional rendering of the user interface element; and in accordance with a determination that the one or more criteria are not satisfied, transmitting instructions to the two-dimensional display device to display a two-dimensional rendering of the user interface element.

Some embodiments are directed to a non-transitory computer readable storage medium storing instructions that, when executed by an electronic device including memory and one or more processors coupled to the memory and to one or more output devices, causes the electronic device to: while the electronic device is in communication with a two-dimensional display device and a three-dimensional display device included in the one or more output devices, display, using the one or more output devices, a user interface element associated with an application running on the electronic device, including in accordance with a determination that one or more criteria are satisfied, transmitting instructions to the three-dimensional display device to display a three-dimensional rendering of the user interface element; and in accordance with a determination that the one or more criteria are not satisfied, transmitting instructions to the two-dimensional display device to display a two-dimensional rendering of the user interface element.

Technology implementors are reminded that sharing data between electronic devices should be performed in accordance with privacy practices meeting or exceeding applicable laws and/or industry standards. These privacy practices may include, but are not limited to, requiring user permission to share the data and/or permitting the user to opt-out of processing and/or storing some or all of the data and/or anonymizing the data, and so forth. For example, implementers of devices may explain in its user interface and documentation the devices ability to share and receive data, and require appropriate parties to opt-in before sharing data.

The invention claimed is:

1. An electronic device comprising:
memory; and
one or more processors coupled to the memory and to one or more output devices, the one or more processors configured to:
    while the electronic device is in communication with a two-dimensional display device and a three-dimensional display device included in the one or more output devices, display, using the one or more output devices, a user interface element associated with an application running on the electronic device, including:
        in accordance with a determination that one or more criteria are satisfied, transmitting instructions to the three-dimensional display device to display a three-dimensional rendering of the user interface element;
        in accordance with a determination that the one or more criteria are not satisfied, transmitting instructions to the two-dimensional display device to display a two-dimensional rendering of the user interface element; and
        in accordance with a determination that one or more second criteria are satisfied, transmitting instructions to the three-dimensional display device to display a first portion of the user interface element in a three-dimensional container, and to display a second portion of the user interface element in a two-dimensional container.

2. The electronic device of claim 1, wherein the one or more processors are configured to:
    while displaying the three-dimensional rendering of the user interface element using the three-dimensional display device, receive, from the three-dimensional display device, an indication of an update to the three-dimensional rendering of the user interface element; and
    in response to receiving the indication of the update to the three-dimensional rendering of the user interface element, update the two-dimensional rendering of the user interface element in a manner corresponding to the update to the three-dimensional rendering of the user interface element.

3. The electronic device of claim 1, wherein the one or more processors are further configured to:
    in accordance with a determination that one or more third criteria are satisfied, transmit instructions to the three-dimensional display device to display the two-dimensional rendering of the user interface element in a three-dimensional environment.

4. The electronic device of claim 1, wherein the one or more processors are further configured to:
    while displaying the three-dimensional rendering of the user interface element using the three-dimensional display device, receive, using one or more input devices in communication with the electronic device, a user input corresponding to a request to display the two-dimensional rendering of the user interface element; and in response to receiving the user input, transmit second instructions to display the two-dimensional rendering of the user interface element.

5. The electronic device of claim 4, wherein transmitting the second instructions to display the two-dimensional rendering of the user interface element includes transmitting the second instructions to display the two-dimensional rendering of the user interface element to the two-dimensional display device.

6. The electronic device of claim 4, wherein transmitting the second instructions to display the two-dimensional rendering of the user interface element includes transmitting the second instructions to display the two-dimensional rendering of the user interface element to the three-dimensional display device.

7. The electronic device of claim 1, wherein the one or more processors are further configured to:
    while displaying the two-dimensional rendering of the user interface element, receive, using one or more input devices in communication with the electronic device, a user input corresponding to a request to display the three-dimensional rendering of the user interface element; and
    in response to receiving the user input, transmit second instructions to the three-dimensional display device to display the three-dimensional rendering of the user interface element.

8. The electronic device of claim 1, wherein the one or more criteria include a criterion that is satisfied when the electronic device is in communication with the three-dimensional display device.

9. The electronic device of claim 1, wherein the one or more processors are configured to:
    while the one or more criteria are not satisfied, and while displaying the two-dimensional rendering of the user interface element, detect the one or more criteria transition from being not satisfied to being satisfied, and
    in response to detecting the one or more criteria transition from being not satisfied to being satisfied, transmit instructions to the three-dimensional display device to:
        display an animated transition from displaying the two-dimensional rendering of the user interface element to displaying the three-dimensional rendering of the user interface element, and
        after displaying the animated transition, display the three-dimensional rendering of the user interface element.

10. The electronic device of claim 1, wherein the one or more processors are further configured to:
    receive an indication to update data represented by the user interface element;
    in response to receiving the indication to update the data represented by the user interface element,
        update the data represented by the user interface element;
        update the two-dimensional rendering of the user interface element in accordance with the indication; and
        update the three-dimensional rendering of the user interface element in accordance with the indication.

11. A method comprising:
    at an electronic device including memory and one or more processors coupled to the memory and to one or more output devices:
        while the electronic device is in communication with a two-dimensional display device and a three-dimensional display device included in the one or more output devices, displaying, using the one or more output devices, a user interface element associated with an application running on the electronic device, including:

in accordance with a determination that one or more criteria are satisfied, transmitting instructions to the three-dimensional display device to display a three-dimensional rendering of the user interface element;

in accordance with a determination that the one or more criteria are not satisfied, transmitting instructions to the two-dimensional display device to display a two-dimensional rendering of the user interface element; and in accordance with a determination that one or more second criteria are satisfied, transmitting instructions to the three-dimensional display device to display a first portion of the user interface element in a three-dimensional container, and to display a second portion of the user interface element in a two-dimensional container.

12. The method of claim 11, further comprising:

while displaying the three-dimensional rendering of the user interface element using the three-dimensional display device, receiving, from the three-dimensional display device, an indication of an update to the three-dimensional rendering of the user interface element; and in response to receiving the indication of the update to the three-dimensional rendering of the user interface element, updating the two-dimensional rendering of the user interface element in a manner corresponding to the update to the three-dimensional rendering of the user interface element.

13. The method of claim 11, further comprising:

in accordance with a determination that one or more third criteria are satisfied, transmitting instructions to the three-dimensional display device to display the two-dimensional rendering of the user interface element in a three-dimensional environment.

14. The method of claim 11, further comprising:

while displaying the three-dimensional rendering of the user interface element using the three-dimensional display device, receiving, using one or more input devices in communication with the electronic device, a user input corresponding to a request to display the two-dimensional rendering of the user interface element; and in response to receiving the user input, transmitting second instructions to display the two-dimensional rendering of the user interface element.

15. The method of claim 14, wherein transmitting the second instructions to display the two-dimensional rendering of the user interface element includes transmitting the second instructions to display the two-dimensional rendering of the user interface element to the three-dimensional display device.

16. The method of claim 11, wherein the one or more criteria include a criterion that is satisfied when the electronic device is in communication with the three-dimensional display device.

17. The method of claim 11, further comprising:

while the one or more criteria are not satisfied, and while displaying the two-dimensional rendering of the user interface element, detecting the one or more criteria transition from being not satisfied to being satisfied, and in response to detecting the one or more criteria transition from being not satisfied to being satisfied, transmitting instructions to the three-dimensional display device to:

display an animated transition from displaying the two-dimensional rendering of the user interface element to displaying the three-dimensional rendering of the user interface element, and after displaying the animated transition, display the three-dimensional rendering of the user interface element.

18. The method of claim 11, further comprising:

receiving an indication to update data represented by the user interface element;

in response to receiving the indication to update the data represented by the user interface element, updating the data represented by the user interface element;

updating the two-dimensional rendering of the user interface element in accordance with the indication; and updating the three-dimensional rendering of the user interface element in accordance with the indication.

19. A non-transitory computer readable storage medium storing instructions that, when executed by an electronic device including memory and one or more processors coupled to the memory and to one or more output devices, causes the electronic device to:

while the electronic device is in communication with a two-dimensional display device and a three-dimensional display device included in the one or more output devices, display, using the one or more output devices, a user interface element associated with an application running on the electronic device, including:

in accordance with a determination that one or more criteria are satisfied, transmit instructions to the three-dimensional display device to display a three-dimensional rendering of the user interface element;

in accordance with a determination that the one or more criteria are not satisfied, transmit instructions to the two-dimensional display device to display a two-dimensional rendering of the user interface element; and in accordance with a determination that one or more second criteria are satisfied, transmit instructions to the three-dimensional display device to display a first portion of the user interface element in a three-dimensional container, and to display a second portion of the user interface element in a two-dimensional container.

20. The non-transitory computer readable storage medium of claim 19, wherein the instructions, when executed by the electronic device, further cause the electronic device to:

while displaying the three-dimensional rendering of the user interface element using the three-dimensional display device, receive, from the three-dimensional display device, an indication of an update to the three-dimensional rendering of the user interface element; and in response to receiving the indication of the update to the three-dimensional rendering of the user interface element, update the two-dimensional rendering of the user interface element in a manner corresponding to the update to the three-dimensional rendering of the user interface element.

* * * * *